G. SCHWABACH.
PROCESS OF REMOVING MATERIAL TO BE DUMPED, &c.
APPLICATION FILED OCT. 7, 1916.
1,399,663.
Patented Dec. 6, 1921.
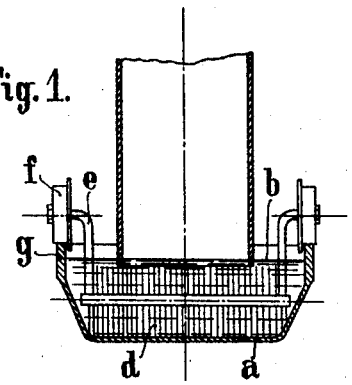
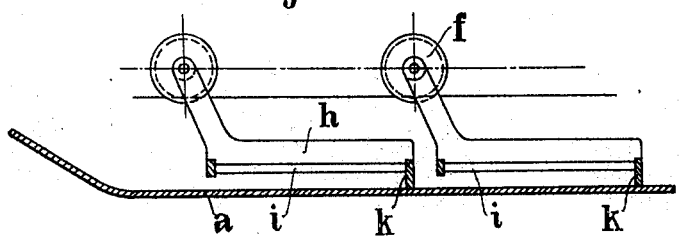
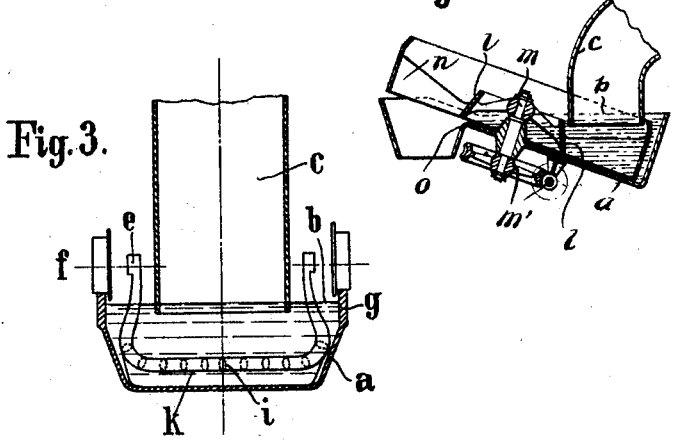

UNITED STATES PATENT OFFICE.

GEORG SCHWABACH, OF CHARLOTTENBURG, NEAR BERLIN, GERMANY.

PROCESS OF REMOVING MATERIAL TO BE DUMPED, &c.

1,399,663.  Specification of Letters Patent.  Patented Dec. 6, 1921.

Application filed October 7, 1916. Serial No. 124,405.

(GRANTED UNDER THE PROVISIONS OF THE ACT OF MARCH 3, 1921, 41 STAT. L., 1313.)

*To all whom it may concern:*

Be it known that I, GEORG SCHWABACH, a citizen of the German Empire, and residing at Charlottenburg, near Berlin, Germany, have invented a new and useful improved process of removing material to be dumped, particularly hot ashes, clinker, coke, dust, and the like, from furnace installations and the like, and apparatus therefor, (for which I have filed an application in Germany, Feb. 11, 1915,) of which the following is a specification.

This invention relates to an improved process of removing material to be dumped, particularly hot ashes, clinker, coke, dust and the like, from furnace installations, boiler plants, coke-ovens, refuse destructors, feed-heaters and like plants, and to improved apparatus for carrying the process into practice.

As is well known, the removal of waste material from such plants is a troublesome and difficult operation not only on account of the considerable quantities to be dealt with, but also owing to the high temperature of the material and the noxious exhalations arising therefrom. In addition, the furnaces suffer from the admission of secondary air when the ashes, clinker and the like are removed continuously while the furnace installation is working. If closure devices are provided these suffer under the heat and the destructive action of the hot dust and in many cases break down after working a short time. In addition, the hot material must be quenched after being removed from the furnace installation and before being dumped into heaps.

A primary object of my invention is to provide an improved process of removing materials of the kind described from furnace installations of the type mentioned above to which these defects are not attached, and I attain this end by arranging that the material is conducted into a tank containing water without its coming into contact with the atmosphere.

Another object is to provide improved apparatus for carrying the process into practice. In this apparatus I provide that the discharge pipes of the ash-pits of the furnace installations lead not as heretofore into the atmosphere, for example into the ash cellar, but under water, so that the discharged ashes pass into the tanks filled with water without first coming into contact with the outer air and without any doors or dampers having to be actuated.

Another object of the invention is to provide that the material to be dumped which has passed into the tank is removed without its coming into contact with the atmosphere, without its annoying the workmen and without its prejudicially affecting mechanical devices. I attain this end by making the tank in the form of a conveyer channel in which the waste material is conveyed by means of a sweeping or conveying device. The latter may comprise, for example, blades, rakes or brushes which are driven along the edge of the channel and are held together in a suitable frame, or it may preferably comprise members formed as shovels whose carrying surfaces are formed like a grate. The arrangement of a conveyer channel is particularly suitable when several discharge pipes open into the same tank. In small plants, in which the quenched material is to be removed from the tank directly at the place where it falls in, it will be preferable to arrange a conveyer wheel placed slantwise relatively to the surface of the water.

To these ends the invention consists in the operations, and in the arrangement, construction and combination of parts described hereinafter and pointed out in the claims.

Various forms of apparatus according to the invention are represented by way of example in the accompanying drawings wherein:—

Figure 1 shows the arrangement of a conveyer channel with a sweeping device in vertical sectional elevation, and Figs. 2 and 3 are, respectively, longitudinal and transverse sections showing a conveying device comprising parts formed like shovels;

Fig. 4 is a vertical section showing a scraping wheel for removing the waste material.

In the figures, *a* denotes a tank containing water in which a discharge pipe *c* opens under the surface *b* of the water. In the apparatus shown in Fig. 1 the tank *a* contains a sweeping device *d*, *e* comprising rakes, brushes or blades *d* which sweep along the bottom and sides of the tank and along the surface of the water, and are carried by the frame *e*. The frames are carried by wheels or rollers *f* which run on the preferably thickened edges of the tank designed to constitute rails. One end of the bottom of the tank or conveyer channel $a$ preferably slants upward so that the sweeping or conveying device brings the waste material in small quantities at a time out of the water. The thoroughly wet waste material cannot produce any dust nor can it cause any annoyance otherwise.
In the apparatus shown in Figs. 2 and 3 the sweeping or conveying device comprises carrying members $h$ formed like a shovel for catching and conveying large pieces of clinker; these members $h$ are preferably perforated or comprise bars $i$, so that the small parts of the waste material can fall to the bottom of the tank or channel $a$, along which they are pushed by scrapers $k$ carried by the members $h$ which preferably have wheels $f$ running on the sides of the channel.

In plants in which it is desired that the material shall emerge from the water close to where it enters, or when the material is discharged through only one pipe, the form of apparatus shown in Fig. 4 may be employed. In this construction it is important that the device used for separating the material shall comprise no immersed joints, pivots or other delicate parts which would be subjected to wear and tear. In Fig. 4 the surface of the water in the tank $a$ is designated $b$ and the discharge pipe $c$. The material is removed from the tank by a blade wheel or rotary scraper $l$ which can be rotated about a slanting axle $m$ by means of gearing $m^1$ or the like. The wheel or rotary scraper $l$ comprises scrapers or blades $n$ arranged at intervals which push the material up the slanting bottom of the tank $a$ until it falls over the edge $o$ of the tank located above the level $b$ of the water, whereupon it is conveyed away by suitable transport devices, such as tilting wagons, conveyer belts or the like, not shown. The blade wheel or rotary scraper $l$ need not necessarily work directly on the bottom of the tank $a$. If desired, the axle $m$ of the wheel may be so arranged that a small clearance space is left between the wheel $l$ and the bottom of the tank.

It may be mentioned, in addition, that the water removed with the wet ashes or clinker is continuously replaced in order that the water in the tank or channel may not be heated excessively. Preferably the water flows in in the same direction as the clinker is removed so that the current of the inflowing water facilitates the removal of the clinker. In order to increase the current the rear end of the channel may be connected with the front end by a circulation tube for producing permanent or temporary circulation of the water.

The power required by the conveying device is exceeding small, particularly as the buoyancy of the waste material conveyed under water diminishes the friction opposing its conveyance.

That part of the tank $a$ which is located directly underneath the end of the pipe $c$ may be made of particularly strong material capable of resisting wear, or it may be made exchangeable.

The form of conveyer shown in Figs. 2 and 3 obviates the defects attached to the simultaneous removal of waste material composed of fine and coarse parts. For whereas the fine parts are preferably conveyed away by pushing them along the bottom of the tank or channel by means of scrapers, this mode of transport is not adapted for use with large pieces of clinker because these heavy and jagged pieces subject the bottom of the tank or channel to great wear and a relatively large amount of power is required for pushing them along.

According to the invention the large pieces of clinker are preferably transported suspended in the water by means of supporting blades or shovels $h$ without their contacting with the bottom of the channel. As the fine parts are readily washed away from the members carrying them and are thus not reliably conveyed away the supports are preferably made in the form of a grate, so that the finer particles of the waster material reach the bottom of the channel and are there pushed away by means of the scrapers or blades $k$. In certain cases non-perforated supports may be used, the finer parts washed off one support arriving in front of the scraper of the next support and being driven along thereby. The carrying surfaces of the various supports or shovels must, of course, be arranged so close together that large pieces of clinker or the like cannot fall through between them.

When the described invention is employed, besides other advantages which are obtained the following may be mentioned. Firstly, no secondary air passes through the discharge pipes into the flues. Secondly, the discharged ash or clinker is quenched immediately, so that its ignition is avoided with certainty. Thirdly, the discharge pipes have a longer life than heretofore and are of a very simple construction owing to the omission of all mechanical closure members.

I claim:—

1. A process of removing material to be dumped into heaps from furnace installations, consisting in directly discharging the material shut off from the atmosphere into water flowing through a tank, and in conveying the material from the tank in the direction of flow of the water.

2. In apparatus for removing material to be dumped into heaps from furnace installations, the combination with a discharge pipe for the material, of a channel containing water sealing the end of the discharge pipe, and conveyer means mounted to run on the sides of the channel for removing material discharged through said pipe.

3. In apparatus for removing material to be dumped into heaps from furnace installations, the combination with a discharge pipe for the material, of a channel containing water sealing the end of the discharge pipe, and conveyer means for removing material discharged into the channel, said conveyer means comprising conveyer elements each having the form of a shovel and having wheels mounted to run on the sides of the channel.

4. In apparatus for removing material to be dumped into heaps from furnace installations, the combination with a discharge pipe for the material, of a channel containing water sealing the end of the discharge pipe, and conveyer means for removing material discharged into the channel, said conveyer means comprising conveyer elements having the form of a shovel, each element having wheels mounted to run on the sides of the channel and a scraper for scraping the bottom of the channel.

5. In apparatus for removing material to be dumped into heaps from furnace installations, the combination with a discharge pipe for the material, of a channel containing water sealing the end of the discharge pipe, and conveyer means for removing material discharged into the channel, said conveyer means comprising grid elements mounted to run on the sides of the channel.

In testimony whereof, I have signed my name to this specification in the presence of two witnesses.

GEORG SCHWABACH.

Witnesses:
HENRY HASPER,
ALLEN F. JENNINGS.